United States Patent
Ladouceur et al.

(10) Patent No.: US 7,557,840 B2
(45) Date of Patent: Jul. 7, 2009

(54) CONTROL METHOD AND SYSTEM FOR A REMOTE VIDEO CHAIN

(75) Inventors: Francois Ladouceur, Arsae en Velay (FR); Briac Hardouin, Paris (FR)

(73) Assignee: France Telecom, Paris (FR)

( * ) Notice: Subject to any disclaimer, the term of this patent is extended or adjusted under 35 U.S.C. 154(b) by 1058 days.

(21) Appl. No.: 10/798,234

(22) Filed: Mar. 11, 2004

(65) Prior Publication Data

US 2004/0212701 A1    Oct. 28, 2004

(30) Foreign Application Priority Data

Mar. 13, 2003    (FR) ................................. 03 03122

(51) Int. Cl.
*H04N 5/262* (2006.01)
*H04N 7/14* (2006.01)

(52) U.S. Cl. ............................. 348/240.99; 348/14.01; 348/14.05; 348/14.12

(58) Field of Classification Search ........... 348/240.99, 348/211.99, 211.5, 14.05
See application file for complete search history.

(56) References Cited

U.S. PATENT DOCUMENTS 6,774,927 B1 *   8/2004   Cohen et al. ............. 348/14.01
2001/0010545 A1 *  8/2001  Sasaki ..................... 348/14.09
2002/0118272 A1   8/2002   Bruce-Smith
2003/0122936 A1 *  7/2003  Pyle et al. .............. 348/211.99
2005/0036036 A1 *  2/2005  Stevenson et al. ...... 348/211.99

FOREIGN PATENT DOCUMENTS

EP    0776130 A2    5/1997
WO   WO 95/11566   4/1995

\* cited by examiner

*Primary Examiner*—David L Ometz
*Assistant Examiner*—Luong T Nguyen
(74) *Attorney, Agent, or Firm*—Patterson, Thuenete, Skaar & Christensen, P.A.

(57) ABSTRACT

Process for commanding a remote video processing chain producing a video stream transmitted to a terminal with a view to acting on the transmitted video stream, this process including steps in which the terminal transmits a command to the remote video processing chain to modify the transmitted video stream, and the video processing chain executes the command on the video stream before transmitting it to the terminal. The video stream processing commands that can be performed by the video processing chain include commands that contain the definition of an image region of the image contained in the transmitted video stream and associated with the definition of processing to be applied to the image region.

19 Claims, 2 Drawing Sheets

CONTROL METHOD AND SYSTEM FOR A REMOTE VIDEO CHAIN

This application claims priority to French Application No. 03 03122 filed Mar. 13, 2003.

1. Technical Field

The invention pertains to a control method and device for a remote video chain.

It applies in particular, but not exclusively, to videophone telecommunications.

2. Background Art

In conventional manner, videophone telecommunications use a video processing chain comprising a capture module, a coding module and a transmission module.

In videophone telecommunications, only a few parameters can be modified by those participating in the communication to optimize the video signal they receive. These parameters can be divided into two categories.

The first category of parameters groups together all those commands with which it is possible to remotely modify the behavior of the coding module of the video stream transmitter, by acting on its particular parameters. For example, protocol H.323 which applies to multimedia communication systems for IP networks (Internet Protocol) offers the possibility of sending a command to enable action upon the remote coder so as to increase the quality of images in a transmitted video stream to the detriment of fluidity, or conversely. Commands of this category are too restrictive and only offer the possibility of globally processing the transmitted video signal.

The second category groups together remote piloting commands for a camera, these commands being defined in protocols which lay down standardized commands to be sent to a remote camera, so as to modify its field of filming by acting mechanically on its orientation and zoom. The application of these protocols in videophone telecommunications implies the use of compatible motorized cameras.

SUMMARY OF THE INVENTION

The purpose of the present invention is to eliminate these disadvantages. This objective is achieved by providing a control method for a remote video processing chain producing a video stream to be transmitted to a terminal, with a view to acting upon the video stream, this method comprising steps during which the terminal transmits a command to the remote video processing chain in order to modify the video stream, and the remote video processing chain carries out the command on the video stream before transmitting it to the terminal.

According to the invention, the video stream processing commands executable by the remote video processing chain comprise processing commands to be applied to an image region, which contain a definition of an image region of the image contained in the transmitted video stream, associated with a definition of a processing operation to be applied to the image region, execution by the remote video chain of a processing command to be applied to an image region comprising a selection step to select the image region in the video stream defined by the command, and a processing step to apply the processing operation defined in the command to the image region selected in the video stream.

According to one particular aspect of the invention, this process also comprises an activation step to activate an optional module in the video processing chain to carry out at least in part a command given by the terminal.

According to another particular aspect of the invention, the video stream processing commands executable by the video processing chain comprise a zoom command associated with an image region to magnify the image region, a movement command to move the image region transmitted in the video stream subsequent to execution of the zoom command, and optionally a resolution increase command associated with an image region to increase the resolution of the image region to the detriment of the remainder of the image transmitted in the video stream.

Advantageously, the video processing chain restores a default image configuration in the video stream after a preset time interval starting from the time of execution of a video stream processing command.

Preferably, video stream processing commands executable by the video processing chain comprise a restore command for restoring a default image configuration of the images transmitted in the video stream.

According to another particular aspect of the invention, the transmission of processing commands for transmitted video stream is conducted in accordance with protocol H.323 or SIP in messages which are ignored by the terminal if it is not compliant with them.

The invention also concerns a system for controlling a first remote video processing chain producing a video stream which is transmitted to a first terminal via a telecommunications network, so as to act upon the transmitted video stream, this system comprising transmission means installed in the first terminal for transmitting to the first remote video processing chain processing commands to be applied to the video stream to be transmitted, and command receiving and execution means installed in the first remote video processing chain, for receiving and executing video stream processing commands on the video stream to be transmitted by the first processing chain.

According to the invention, the video stream processing commands executable by the first remote video processing chain comprise processing commands to be applied to an image region, containing a definition of an image region of the image contained in the video stream, associated with a definition of a processing operation to be applied to the image region, the command receiving and execution means installed in the first remote video processing chain comprising selection means for selecting in the video stream the image region defined in a processing command to be applied to said image region, and application means for applying the processing operation defined in the command to the image region selected in the video stream.

According to one particular aspect of the invention this system comprises optional modules inserted in the first video processing chain to carry out at least in part the commands defining a processing operation to be applied to an image region in the transmitted video stream.

Advantageously the optional modules comprise a reframing module.

According to another particular aspect of the invention, the first video processing chain is installed in a second terminal comprising transmission means for transmitting commands to a second video processing chain installed in the first terminal to modify a video stream transmitted by the second video processing chain, the second video processing chain comprising command receiving and execution means for modifying the video stream it transmits.

BRIEF DESCRIPTION OF THE DRAWINGS

One preferred embodiment of the invention is described below by way of a non-restrictive example with reference to the appended drawings in which.

DETAILED DESCRIPTION

Figure 1:
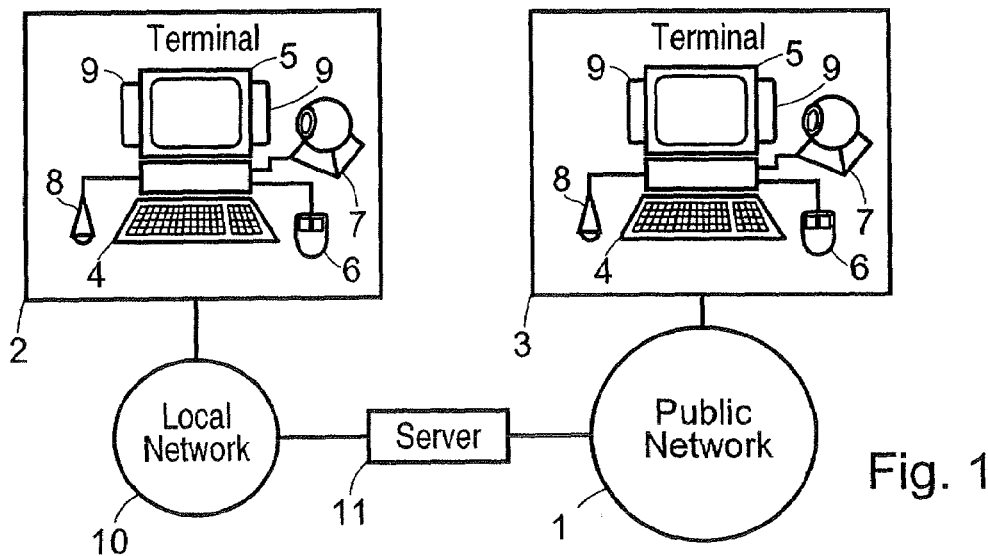
FIG. 1 is a schematic of an example of a videophone telecommunications system to which the method of the invention applies.

FIG. 1 shows a videophone telecommunications system comprising two terminals 2, 3 between which a videophone telecommunication is set up. Each terminal is equipped with a display screen 5, command members such as a keyboard 4 and mouse 6, a camera 7, a microphone 8 and at least one speaker 9.

In the example shown in FIG. 1, terminal 2 is connected via a local network 10 and a local server 11 to a public telecommunications network 1, while terminal 3 is connected directly to network 1.

During a videophone telecommunication, terminals 2, 3 via networks 1, 10 and server 11 exchange video streams containing the images taken by cameras 7 and sounds captured by microphones 8. The exchanged video streams conform, for example, to protocol H.263+ and to QCIF image format (Quarter Common Intermediate), a frequently used video image format in videophone and videoconferencing communications. The invention may also apply to other image formats, such as SQCIF, CIF, 4CIF, 16 CIF.

Figure 2:
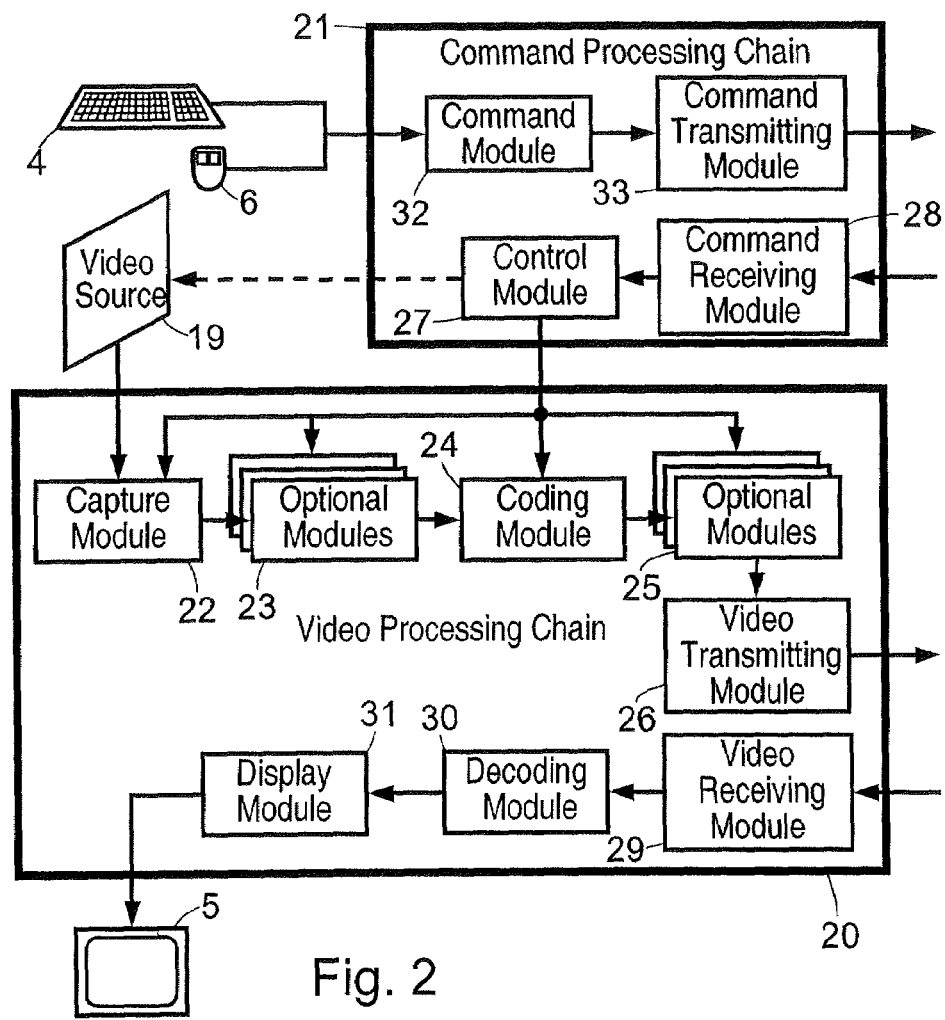
FIG. 2 gives a more detailed diagram of a video processing and command processing chain of the invention, integrated in a terminal.

To generate said video stream, each terminal 2, 3 comprises a video processing chain such as the one shown in FIG. 2. This chain is piloted by a command processing chain 21. The video processing chain 20 comprises a video transmission part to transmit video images taken by the camera or derived from another source 19 to another terminal, and a video receiving part to receive a video stream emitted by this other terminal and to display it on screen 5. The command processing chain comprises a command transmission part designed to transmit commands to the video processing chain of the other terminal, and a command receiving part designed to receive commands emitted by the other terminal and to pilot the transmission part of the video processing chain in relation to commands received.

More precisely, the video transmission part comprises a capture module 22 which receives the video images taken by camera 7 of the terminal or derived from another source, and a coding module 24 designed to code the video stream provided by capture module 22, in particular to compress this stream so as to adapt it to the assigned transmission rate, and a transmission module 26 connected to a communication module of the terminal to place the coded video stream, generated by coding module 24, in the form of packets for its transmission.

The video receiving part comprises a video receiving module 29 designed to reconstitute a video stream from the packets received by the terminal, a video decoding module 30 connected to the receiving module and designed to decode the video stream, and a display module 31 which is connected on one side to the decoding module and on the other side to the display screen 5 of the terminal to reconstruct the decoded video stream.

According to the invention, optional modules 23, 25 are also inserted in the transmission part of the video processing chain 20 upstream and/or downstream from coding module 24, and/or integrated in the latter depending upon the configuration of terminal 2, 3.

The receiving part of the command processing chain comprises a command receiving module 28 which delivers received commands to a control module 27, this module piloting the emitting part of the video processing chain, and in particular the capture module, optional modules 23, 25 and coding module 24 as well as the video source 19 when applicable.

The transmission part of the command processing chain comprises a command module 32 which is connected to control members 4, 6 of the terminal, and which generates commands from the commands given by the user by means of terminal control members 4, 6, and a command transmission module 33 connected to command module 32 and which transmits commands generated by command module 32.

Figure 3:
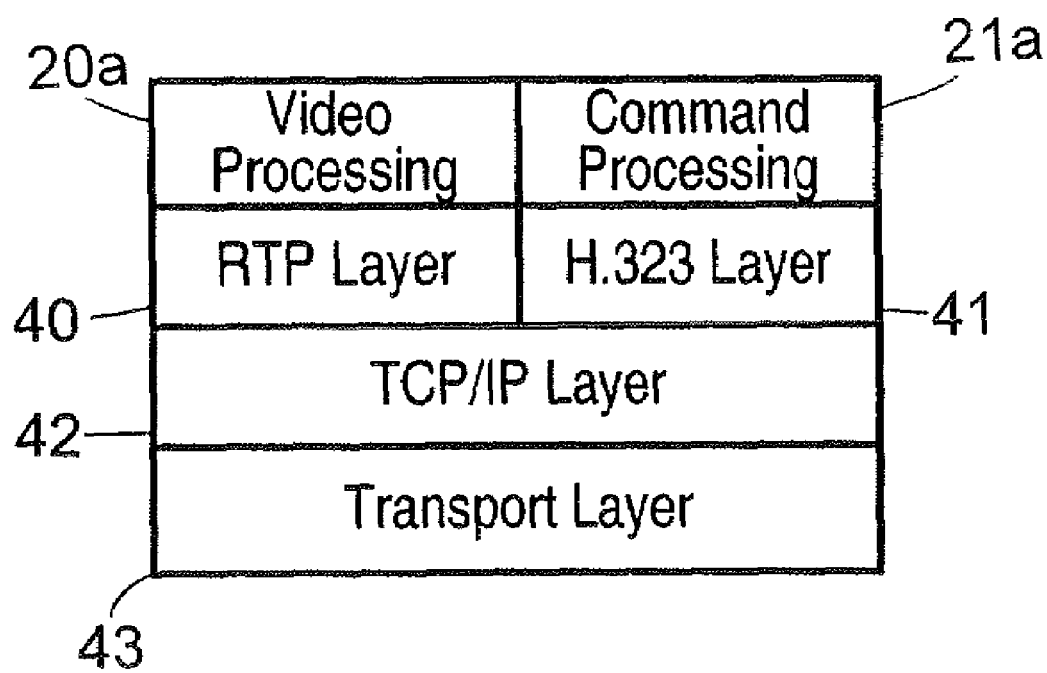
FIG. 3 shows the software organization of programs installed in a terminal.

As shown in FIG. 3, the two processing chains (video and commands) 20, 21 are in the form of an applicative software layer. A command processing layer 21a uses a software layer 41 implementing protocol H.323, for example, or SIP (Session Initiation Protocol) to transmit and receive commands from a remote terminal. If protocol H.323 is used, the commands are transmitted in the form of "Facility" messages enabling the transmission of owner data. If the SSIP protocol is used, the commands may be transmitted using the "INFO" message. These two types of messages have the advantage of being ignored by the addressee terminal if it is not compliant therewith, so that it remains possible to maintain the interoperability of the terminals.

A video processing layer 20a uses a software layer 40 implementing protocol RTP (Real Time Protocol) or analog, to transmit and receive video streams in the form of packets. The two layers 40 and 41 are designed to be interfaced with a layer 42 implementing the protocol TCP/IP (Transmission Control Protocol/Internet Protocol) grouping together the protocols used for the Internet network. Layer 42 can be used to physically access the network using transport layer 43.

During a videophone telecommunication, for example between terminals 2 and 3, terminal 2 receives a video stream H263+ in QCIF format which is processed by the receiving part of the video processing chain 20. Through the invention the user can act upon the video stream received by means of keyboard 4 and/or mouse 6 by applying commands to the transmission part of the command processing chain 21. These commands are received and processed by the receiving part of the command processing chain 21 of the other terminal 3 and are used to pilot the transmission part of the video processing chain of terminal 3.

The piloting commands which are generated by command module 32 are in the following format for example:

Region<specification of an image region>,
    <Commands to be applied to the region>)

Typically, an image region is defined by its shape and size, for example "RECTANGLE (<coordinates of upper left point>, <coordinates of lower right point>)".

In addition to conventional commands with which to act on the quality of the transmitted images and therefore on transmission rate, these commands may be:

ZOOM to magnify the region specified in the command,
BETTER_RESOLUTION to obtain better resolution of the region specified in the command,
GO to move the magnified region to another part of the basic image.

If the user gives a zoom command, for example in the form "Region(RECTANGLE((80,80),(176,144)),ZOOM)" to magnify a defined region of the image, the control module 27 can apply several solutions to carry out this command.

If the camera is motorized with zoom command, the control module 27 transmits a command to be applied to the camera for best framing of the region indicated in the command.

If the camera is not motorized, or if the command cannot be fully carried out by the camera (for example if the requested magnification exceeds the zoom capacity of the camera), the control module 27 applied to capture module 22 a format change command for incoming images so as to obtain greater resolution, for example requesting format CIF(352×288 pixels) instead of previously selected QCIF (176×144 pixels). Controls module 27 then activates optional reframing module 23 between the capture module 22 and the coding module so as only to select one part of the image captured and more precisely that part of the image contained in the region indicated in the received command. If the coding module 24 is compliant, the control module 27 may also modify its outgoing format so that it corresponds to that of the specified region, i.e. in the example of the above command, 96×64 pixels.

Normally, to increase the resolution of a video stream, the transmission rate has to be increased since the data transmitted to the decoding module 30 is greater. To solve this problem the invention proposes the local increase in resolution of video images by assigning all or part of the transmission stream available to only one part of the image. The transmission part of the video processing chain will then concentrate its resources on the region requested by the remote user so as to offer the best quality possible by degrading or not coding those zones located outside the requested region.

Therefore if reception module 28 receives a command for better resolution, for example:

"Region (RECTANGLE ((80,86),(176,144)), BETTER_RESOLUTION)", in order obtain better resolution in a defined region of the image, the control module 27 will act on the coding module 24 to allocate the maximum of resources (stream) to coding the region indicated in the command, to the detriment of the remainder of the image.

If, in the received video images, part of the image is a still image, the user can therefore act on the remote video chain using this command so as no longer to receive this still part and to concentrate the resources of the video transmission chain on the desired part of the image.

To move the field of filming, the user can give a command in the following form for example:

Region(RECTANGLE((−176,−20),(0,124)),GO).

In this command, the coordinates of the requested image region are expressed in relation to the current image region.

To process this command, there are several possibilities depending on whether or not the capture source can be moved. The capture source may be a motorized camera or a module for capturing a window in a still image (for example a computer display window). If the capture source can be moved, the command module acts directly on the source to endeavor to reach the region specified in the received command. If not, the control module 27 activates and commands an optional reframing module 23 and applies to it the region of the image to be transmitted.

Provision may be made for those modifications applied to the transmission part of the video processing chain to have a temporary nature and to disappear after a preset time interval, the transmission part then reverting to a default configuration.

Alternately, these modifications remain final until receipt of another command. Provision may be made in this case for a restore command to restore a default configuration.

Commands other than those described above may be provided without departing from the scope of the invention. For example, the remote terminal may be a server which produces a video image grouping together several video streams for videoconferencing. In this case, commands may be provided to act specifically on one of the video streams and on the presentation of the video streams in the image.

The invention claimed is:

1. A method for acting upon a video stream to be transmitted to a receiving terminal, the method comprising:
   transmitting the video stream from a transmitting terminal to a remote video processing chain in the receiving terminal;
   receiving in a transmitting command processing chain within the transmitting terminal, video stream processing commands from the receiving terminal to be executed by a transmitting video processing chain, said video stream processing commands including a definition of the image region of an image contained in the transmitted video stream, the definition of the image region being associated with a particular video stream processing operation to be applied to the image region; and
   executing the video stream processing commands by the transmitting video processing chain wherein the defined image region is selected and the particular video stream processing operation is applied to the defined image region in the video stream.

2. The method according to claim 1, further comprising a step of activating an optional module in the transmitting video processing chain to execute at least in part the video stream processing commands transmitted by the receiving terminal.

3. The method according to claim 1, wherein the video stream processing commands executable by the transmitting video processing chain, comprise a zoom command associated with the image region to magnify the image region selected in the video stream.

4. The method according to claim 3, wherein the video stream processing commands, executable by the transmitting video processing chain, comprise a move command to move the image region transmitted in the video stream subsequent to execution of the zoom command.

5. The method according to claim 1, wherein the video stream processing commands executable by the transmitting video processing chain comprise a resolution increase command associated with the image region to increase the resolution of the image region.

6. The method according to claim 1, wherein the transmitting video processing chain restores a default image configuration in the video stream after a preset time interval from the time of execution of the video stream processing command.

7. The method according to claim 1, wherein the video stream processing commands executable by the transmitting video processing chain comprise a command to restore a default image configuration in the video stream.

8. The method according to claim 1, wherein the video stream processing commands are received in accordance with protocol H.323 or SIP in messages which are ignored by the transmitting terminal if the messages are not compliant therewith.

9. A system for controlling a first remote video processing chain producing a video stream which is transmitted to a first terminal via a telecommunications network, the system comprising:
   first transmission means installed in the first terminal for transmitting to the first remote video processing chain, video stream processing commands to be applied to the video stream to be transmitted, receiving means installed in the first remote video processing chain for receiving the video stream processing commands on the video stream to be transmitted by the first remote video processing chain, and executing means installed in the first remote video processing chain, for executing the video stream processing commands on the video stream to be transmitted by the first remote video processing chain, wherein the video stream processing commands executable by the first remote video processing chain comprise image processing commands to be applied to an image region, the image processing commands including a definition of the image region of an image contained in the transmitted video stream, the image region associated with a definition of a processing operation to be applied to the image region, and the executing means installed in the first remote video processing chain comprise selection means to select the image region defined in the image processing commands that is to be applied to the image region, and application means to apply the processing operation defined in the image processing commands to the image region selected in the video stream.

10. The system according to claim 9 further comprising optional modules inserted in the first remote video processing chain to execute at least in part the image processing commands defining the processing operation to be applied to the image region in the transmitted video stream.

11. The system according to claim 10, wherein the optional modules comprise a reframing module.

12. A method for acting upon a video stream to be received from a transmitting terminal, the method comprising:

receiving in a receiving video processing chain within a receiving terminal a video stream sent from the transmitting terminal;

transmitting video stream processing commands from a receiving command processing chain within the receiving terminal to the transmitting terminal, the video stream processing commands being executed by a transmitting video processing chain in the transmitting terminal, the video stream processing commands including a defined image region of an image to be acted upon in the video stream, the defined image region being associated with a particular video stream processing operation to be applied to the defined image region;

receiving in the receiving video processing chain an acted upon video stream from the transmitting terminal, wherein the video processing commands have been applied to the defined image region; and displaying the acted upon video stream on a display screen of the receiving terminal.

13. The method according to claim 12, further comprising:
selecting the particular video stream operation to be applied to the defined image regions such that the transmitted video stream processing commands activate an optional module in the transmitting video processing chain such that the selected video stream operation has been applied to the acted upon video stream.

14. The method according to claim 13, wherein the selecting the particular video stream operation comprises selecting a zoom command associated with the defined image region to magnify the defined image region in the acted upon video stream.

15. The method according to claim 14, wherein the selecting the particular video stream operation comprises selecting a move command to move the defined image region in the acted upon video stream subsequent to execution of the zoom command.

16. The method according to claim 13, wherein the selecting the particular video stream operation comprises selecting a resolution increase command associated with the defined image region to increase the resolution of the defined image region.

17. The method according to claim 13, wherein the selecting the particular video stream operation comprises selecting an image restore command associated with the defined image region to restore a default image configuration to the acted upon video stream.

18. The method according to claim 12, further comprising:
receiving in the receiving video processing chain a restored default image configuration in the acted upon video stream after a preset time interval from the time of execution of the video stream processing commands by the transmitting video processing chain.

19. The method according to claim 12, wherein the video processing commands from the receiving command processing chain are transmitted in accordance with protocol H.323 or SIP.

* * * * *